United States Patent
Manavar et al.

(10) Patent No.: US 11,748,292 B2
(45) Date of Patent: Sep. 5, 2023

(54) FPGA IMPLEMENTATION OF LOW LATENCY ARCHITECTURE OF XGBOOST FOR INFERENCE AND METHOD THEREFOR

(71) Applicant: Tata Consultancy Services Limited, Mumbai (IN)

(72) Inventors: Piyush Manavar, Thane West (IN); Manoj Nambiar, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 144 days.

(21) Appl. No.: 17/491,689

(22) Filed: Oct. 1, 2021

(65) Prior Publication Data

US 2022/0237141 A1 Jul. 28, 2022

(30) Foreign Application Priority Data

Jan. 27, 2021 (IN) .............................. 202121003639

(51) Int. Cl.
G06F 13/36 (2006.01)
G06F 13/42 (2006.01)
G06N 20/20 (2019.01)

(52) U.S. Cl.
CPC ......... G06F 13/4221 (2013.01); G06N 20/20 (2019.01); G06F 2213/0026 (2013.01)

(58) Field of Classification Search
CPC ........ G06F 13/4221; G06F 2213/0026; G06N 20/20; G06N 5/01; G06N 3/063
See application file for complete search history.

(56) References Cited

U.S. PATENT DOCUMENTS

| | | | |
|---|---|---|---|
| 8,131,659 B2* | 3/2012 | Xu .......................... | G06N 3/084 706/15 |
| 2018/0314933 A1* | 11/2018 | Bleiweiss .............. | G06N 3/042 |
| 2022/0051104 A1* | 2/2022 | Interlandi ............... | G06N 3/045 |
| 2022/0101438 A1* | 3/2022 | Gao ................... | G06Q 30/0201 |
| 2022/0222196 A1* | 7/2022 | Cui ....................... | G06F 9/546 |
| 2022/0237141 A1* | 7/2022 | Manavar ............. | G06F 13/4221 |

FOREIGN PATENT DOCUMENTS

EP 3 370 150 B1 2/2020

OTHER PUBLICATIONS

Summers et al., "Fast inference of Boosted Decision Trees in FPGAs for particle physics," (2020).

* cited by examiner

Primary Examiner — Henry Tsai
Assistant Examiner — Kim T Huynh
(74) Attorney, Agent, or Firm — Finnegan, Henderson, Farabow, Garrett & Dunner LLP

(57) ABSTRACT

Various embodiments disclosed herein provides method and system for low latency FPGA based system for inference such as recommendation models. Conventional models for inference have high latency and low throughput in decision making models/processes. The disclosed method and system exploits parallelism in processing of XGB models and hence enables minimum possible latency and maximum possible throughput. Additionally, the disclosed system uses a trained model that is (re)trained using only those features which the model had used during training, remaining features are discarded during retraining of the model. The use of such selected set of features thus leads to reduction in the size of digital circuit significantly for the hardware implementation, thereby greatly enhancing the system performance.

9 Claims, 11 Drawing Sheets

FPGA IMPLEMENTATION OF LOW LATENCY ARCHITECTURE OF XGBOOST FOR INFERENCE AND METHOD THEREFOR

PRIORITY CLAIM

This US patent application claims priority under 35 U.S.C. § 119 to Indian complete application no. 202121003639, filed on 27 Jan. 2021. The entire contents of the aforementioned application are incorporated herein by reference.

TECHNICAL FIELD

The disclosure herein generally relates to high performance computing, and, more particularly, to a field programmable gate array (FPGA) implementation of low latency programmable architecture of XGBoost for inference and method therefor.

BACKGROUND

Making decisions in real time is essential, especially if the context in which decision is being subjected to changes or cannot be predetermined. An example of real time context-based decision making is in retail product recommendation application that supports a large number of concurrent users. Such an application necessitates high performance computing framework. Typically, such applications utilize gradient boosted trees algorithm to make inferences. However, the implementation of the algorithms is estimated to be computationally expensive for very high concurrent user workloads.

SUMMARY

Embodiments of the present disclosure present technological improvements as solutions to one or more of the above-mentioned technical problems recognized by the inventors in conventional systems. For example, in one embodiment, a method for FPGA implementation of low latency architecture of XGBoost for inference is provided. In another aspect, a method for FPGA implementation of low latency architecture of XGBoost for inference is provided. The method includes accessing, via one or more hardware processors, a FPGA pipeline comprising a PCI express-AXI bridge, a control block, a trained Model, a tree architecture auto generation model, wherein the trained model is trained on a first set of features, and wherein the first set of features are identified based on a plurality of features extracted from an original training dataset and a second set of features discarded/unused during a previous training; Further the method includes receiving the first set of features from the host server to the FPGA via the PCIe express to AXI bridge, via the one or more hardware processors. Furthermore the method includes determining, by the control block, a number of XGboost (XGB) models required for processing the first set of features based on a count of a set of PCIe connections associated with width of the PCI express-AXI bridge and a count of a set of XGB input connections available with each of the XGB models, via the one or more hardware processors. Moreover, the method includes selectively activating, in each clock cycle from amongst a plurality of clock cycles, one or more XGB input connections from amongst a set of XGB input connections available at the determined number of XGB models based on a number of current clock cycle from amongst the plurality of clock cycles, via the one or more hardware processors, wherein selectively activating the one or more XGB input connections at the determined number of XGB models in each clock cycle results in one or more unused XGB input connections from one or more previous clock cycles. Additionally the method includes utilizing, via the one or more hardware processors, the one or more unused XGB input connections for the processing in one or more subsequent clock cycles.

In another embodiment, the system includes a memory storing instructions, one or more communication interfaces, and one or more hardware processors coupled to the memory via the one or more communication interfaces, wherein the one or more hardware processors are configured by the instructions to access a FPGA pipeline comprising a PCI express-AXI bridge, a control block, a trained Model, a tree architecture auto generation model, wherein the trained model is trained on a first set of features, and wherein the first set of features are identified based on a plurality of features extracted from an original training dataset and a second set of features discarded/unused during a previous training. Further, the one or more hardware processors are configured by the instructions to receive the first set of features from the host server to the FPGA via the PCIe express to AXI bridge. Furthermore, one or more hardware processors are configured by the instructions to determine, by the control block, a number of XGboost (XGB) models required for processing the first set of features based on a count of a set of PCIe connections associated with width of the PCI express-AXI bridge and a count of a set of XGB input connections available with each of the XGB models, via the one or more hardware processors. Also, the one or more hardware processors are configured by the instructions to selectively activate, in each clock cycle from amongst a plurality of clock cycles, one or more XGB input connections from amongst a set of XGB input connections available at the determined number of XGB models based on a number of current clock cycle from amongst the plurality of clock cycles, wherein selectively activating the one or more XGB input connections at the determined number of XGB models in each clock cycle results in one or more unused XGB input connections from one or more previous clock cycles. Moreover, the one or more hardware processors are configured by the instructions to utilize the one or more unused XGB input connections for the processing in one or more subsequent clock cycles.

In yet another aspect, there are provided one or more non-transitory machine readable information storage mediums comprising one or more instructions which when executed by one or more hardware processors causes at least one of: accessing, via one or more hardware processors, a FPGA pipeline comprising a PCI express-AXI bridge, a control block, a trained Model, a tree architecture auto generation model, wherein the trained model is trained on a first set of features, and wherein the first set of features are identified based on a plurality of features extracted from an original training dataset and a second set of features discarded/unused during a previous training; Further the method includes receiving the first set of features from the host server to the FPGA via the PCIe express to AXI bridge, via the one or more hardware processors. Furthermore, the method includes determining, by the control block, a number of XGboost (XGB) models required for processing the first set of features based on a count of a set of PCIe connections associated with width of the PCI express-AXI bridge and a count of a set of XGB input connections available with each of the XGB models, via the one or more hardware processors. Moreover, the method includes selectively activating, in each clock cycle from amongst a plurality of clock cycles, one or more XGB input connections from amongst a set of XGB input connections available at the determined number of XGB models based on a number of current clock cycle from amongst the plurality of clock cycles, via the one or more hardware processors, wherein selectively activating the one or more XGB input connections at the determined number of XGB models in each clock cycle results in one or more unused XGB input connections from one or more previous clock cycles. Additionally the method includes utilizing, via the one or more hardware processors, the one or more unused XGB input connections for the processing in one or more subsequent clock cycles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Making decisions in real time is essential, especially if the context in which decision is being is subject to change or cannot be predetermined. An example of real time context-based decision making is in retail product recommendation application that supports a large number of concurrent users.

Recommending products to online retail customers can greatly increase the chance of product purchases and enrich customer engagement with the business. The end user is benefited as he/she has to spend less time searching for products they are interested. So are the retail enterprises as they move closer to their business targets. Real-time product recommendations are highly desirable as opposed to online recommendations for better customer engagement. However, recommending products in real time is a computationally challenging task due to concurrent users' requests especially during popular festivals or large sale events. The concurrent user workload could be in the order of hundreds of thousands of users. Generating real-time recommendations at this scale generally requires a lot of computations. The required computation capacity increases many-fold, especially when calculations have to be repeated on a per product basis for each user Conventionally, FPGA is one the main compute accelerator platforms available today. FPGA's provide the user to implement a power efficient hardware architecture for data flow (like ML/DL) workloads. A custom hardware architecture can be algorithm specific and needs to include only the specific hardware units that are required by the algorithm. Outputs can be computed from inputs as efficiently as permitted by data dependencies. FPGAs have been growing in size over the last 3 decades and with that open up more possibilities on the applications they can accelerate. The insights gained in this experience will provide a useful reference for implementing product recommendation systems based on XGBoost model.

XGBoost model is used in machine learning which uses binary decision trees as a core element for inference. Use of XGBoost involves two stages: training the model followed by inference on the trained model. During the training process of the model, a large number of structured data set with fixed number of features is applied to an untrained model. Using these given input datasets, the model computes its internal parameters based on the input pattern and tunes its values for inference. During inference process, the trained model is used for inference, where a single data is given as an input to the trained model and based on the input pattern, and the trained model produces an inference.

Figure 1A:
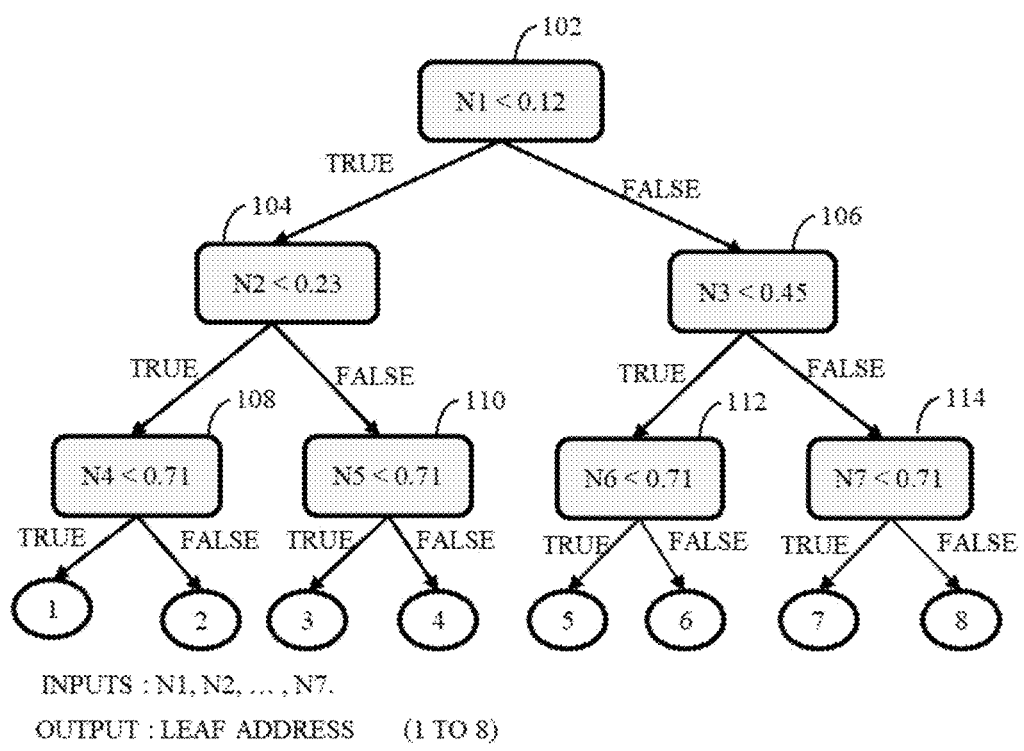
FIGS. 1A-1B illustrate an example of XGBoost tree processing in accordance with an example embodiment
Figure 1B:
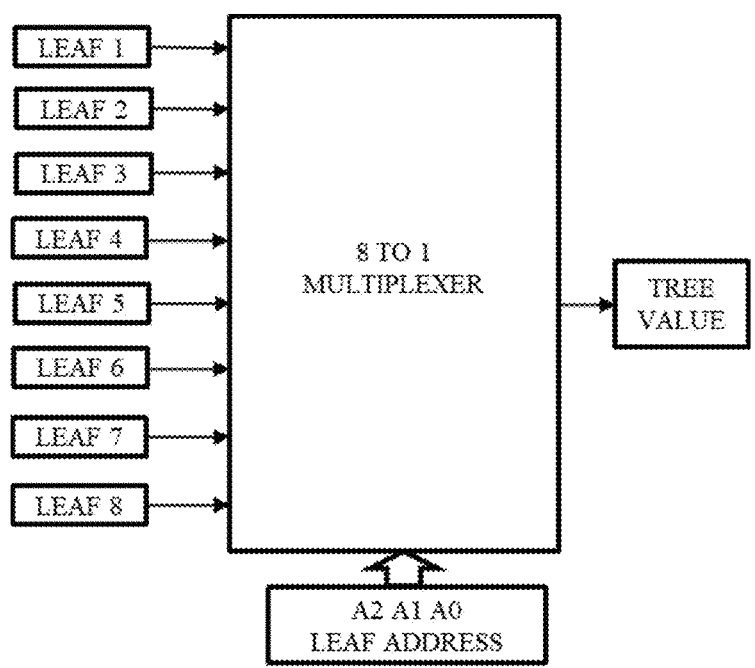
Figure 2:
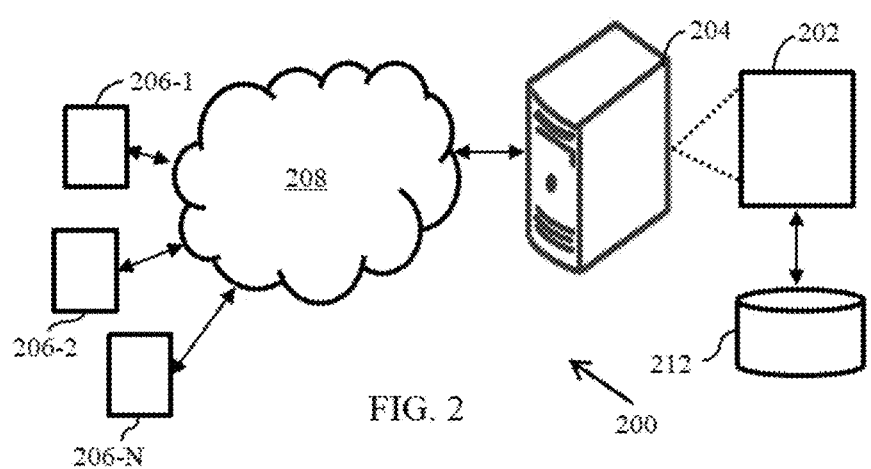
FIG. 2 is a network implementation of a system implementing a low latency FPGA for inference by AI model, in accordance with an example embodiment.

For the purpose of training, the data is preprocessed. In an embodiment, the data from various sources may be merged together followed by converting the data into a common data format. The merged and converted data may include all the attributes available from the original data. Feature engineering may be applied on this merged and converted data which generates a set of additional (derived) features from the data. Apart from adding new features, many features may be expanded in dimension to encode them as one hot feature vectors. The features that are categorical in nature may be encoded as one hot encoded data resulting in additional features. At the end of the feature engineering, a set of features is obtained. This pre-processed data with the set of features is passed to the XGBoost machine learning algorithm. The pre-processed data may be split into a training data and test data. Upon conclusion of the training of the model, resulting XGBoost model may have a plurality of XGBoost trees such that the decision trees may be associated with a maximum depth. The XGBoost trees takes one or more features as input. As illustrated in FIG. 1A, traversing from the root node to the leaf node depends on the values of the input features and the model parameters. The input features are compared with the relevant model parameter. The result of the comparison determines the direction of the tree traversal. Once a leaf node is reached it determines a numerical (real) value, also referred to as tree value (V), as illustrated in FIG. 1B. Considering that there are 100 trees, 100 such tree values may be produced. All the TVs will be added to produce one value which will determine the probability of the user making the order.

There exist many retail scenarios (for e.g, groceries) where it is possible that the user's buying probability may be based on the user's purchase history. In such scenarios, it may be essential that user's buying probability may depend on the features which may further differ from product to product. The user's retail behavior and the product attributes together can be used by an inferencing algorithm like XGBoost to predict the probability of the user buying the product. Herein, it will be understood that for a user inferencing algorithm may have to be invoked as many times as the number of products. An example of a tree processing is illustrated with reference to FIG. 1A.

Referring now to FIG. 1A, an example of XGBoost tree processing is illustrated in accordance with an example embodiment. A node 102 is a root node which is followed by various leaf nodes, namely 104, 106, 108, 110 and so on. The inputs to the tree as shown as n1, n2, . . . , n7, and output of tree processing is obtained as leaf nodes (1, 2, . . . , 8).

In an example scenario, a single XGBoost algorithm invocation may take 4 ms for a single threaded CPU implementation. In multi-threaded implementation on a 56 core server, nearly 250*56=14000 inferences per second for 500 inferences to be made per user, a multi-threaded system can support around 28 (=14000/500) users per second. As is seen, this is a challenging proposition in terms of cost, because to server 1000 users a second one would need roughly 1000/25=40 server which would incur high cost even in a public cloud environment. The use of computing accelerators, for example, a FPGA in recommendation systems provides large computing resources at a comparatively affordable cost.

In the aforementioned process, the structured data and especially, the number of features (usually referred as "columns" in machine learning domain) plays an important role for training and inference. The larger the number of features, the greater amount of the time taken by the model for training as well as for the inference. One of the main technical challenge in conventional systems is the time taken by the model. For instance, when the aforementioned process is implemented in a high end machine with 56 core CPU and 256 GB memory for real time product recommendation (inference) for a user (e.g.: an e-commerce application), it takes around 13 ms to produce one recommendation per user when using 1100 features as an input. The same machine takes ~45 ms to recommend 500 products to 22 users in one second with optimization and parallelization done in programing. However, with the same architecture, computing up to 1000 product recommendation to 100 users (1 L inference) in one second is challenging.

The disclosed method and system provide technical solution to the aforementioned technical challenges associated with implementation of a recommendation model for inference by reducing inference time without compromising the accuracy of the inference. For example, in an embodiment, the disclosed system implements a low latency FPGA based pipelined architecture for XGBoost (XGB) which can be used for inference. In an embodiment, the disclosed system selectively activates XGB input connections available at the determined number of XGB models based on a number of current clock cycle from amongst the plurality of clock cycles, wherein selectively activating the one or more XGB input connections at the determined number of XGB models in each clock cycle results in one or more unused XGB input connections from one or more previous clock cycles.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 2 through 6, where similar reference characters denote corresponding features consistently throughout the figures, there are shown preferred embodiments and these embodiments are described in the context of the following exemplary system and/or method.

FIG. 1 illustrates an example network implementation 100 of a system 102 for low latency-based FPGA system for use in inference by artificial intelligence (AI) model in accordance with an example embodiment. In an embodiment, the system 102 is capable of generating the low latency-based FPGA architecture directly from a trained model. The FPGA based pipelined architecture for XGBoost algorithm is capable of auto integration (efficient mapping) with the PCIe to AXI bridge. The auto-generation of the FPGA architecture and implementation of the same for XGBoost is described further in the description below.

In an embodiment, the disclosed system may be implemented in a server that is capable of interacting with multiple electronic devices (or user devices). Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 3-7.

Figure 3:
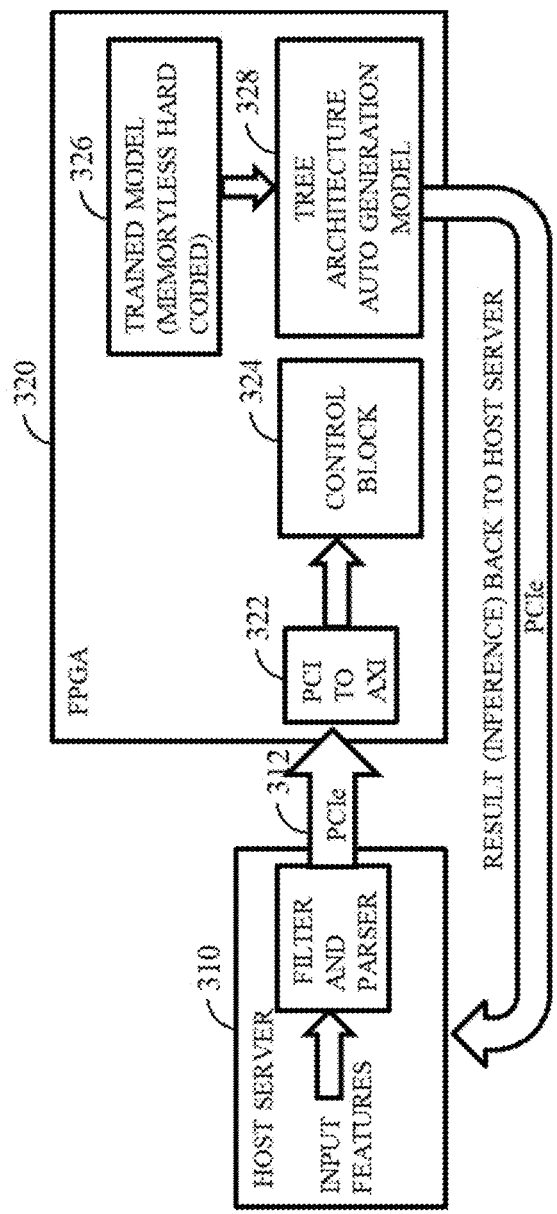
FIG. 3 is an architecture of a system implementing a low latency FPGA for inference by AI model in accordance with some embodiments of the present disclosure.

FIG. 3 illustrates CPU-FPGA architecture 300 for a low latency system to be used for inference by an artificial intelligence (AI) model, in accordance with an example embodiment. As illustrated in FIG. 3, the CPU-FPGA architecture 300 includes a host server 310 communicably coupled with a FPGA pipeline 320.

In an embodiment, the model is trained using a plurality of features derived from an original dataset. Typically, when a model is trained with a certain number of features then the same number of input features have to be provided as input to the model for inferencing. More precisely the same input format is maintained for use in inferencing as it was for training. This means that even the features which are not being used by the model has to be provided even though their values may not matter. This implies that if the same model is used on host server, then the PCIE bandwidth may be unnecessarily used up by unused features which are huge in number. Various embodiments disclosed herein provides method and system to retrain the model with only the features (i.e. a first set of features from amongst the plurality of features) which have actually been used in the model. Hence, using only the first features for inference facilitates in enhancing overall throughput of the system. The host server 310 is capable of takes the plurality of input features and removes the unused features (or second set of features) to obtain the first set of features. In an embodiment, the host server 310 includes a Filter block and a Passer block. The The host sever 310 contains a driver which can be auto-generated by script, for example, a Verilog script. The auto generating script has an ability to generate a driver for a Filter and Passer for CPU block and synthesizable Verilog code for FPGA architecture from the trained model. The Verilog code generates a driver for auto filtering of the unused feature and passing the value from CPU to FPGA via PCIe. The host server 310 creates a single binary file for the input comprising the first set of features, and passes said file along with necessary details to the FPGA via PCIe 312.

The FPGA pipeline 320 is shown to include a PCI express-AXI bridge 322, a control block 324, a trained Model 326, and a tree architecture auto generation model 328. The PCI express-AXI bridge 322 takes the data from the host sever 310 (for example a CPU) through PCIe bus and transmits to consequent block using AXI interface.

The control block 324 communicates using AXI protocol in streaming mode. It has the ability to generate required connection for mapping and necessary handshaking signals to interface with previous block and subsequent blocks of FPGA pipeline. Another advantage of the control block 324 is that it gives flexibility to a user to select between two options, namely single XGBoost (FIFO based) or multi-parallel XGBoost depending on the requirement. The size of FIFO, number of multi parallel blocks, and required number of mapping configuration for parallel blocks can be decided automatically using the script as explained later in the description below.

The trained model 326 contains information of values required by the Trees in XGB for comparison (as described with reference to FIG. 1A-1B). A distinct feature of the disclosed embodiments is that the trained model does not require memory because all the tree values can be generated by connecting the wire connections with VCC or ground. Hence, the training model disclosed herein is also referred to as a memory-less hard-coded model.

The tree architecture auto generation model 328 contains binary decision trees (single XGB or multi parallel XGBs) which takes values from the trained model 326 and control block 324. The auto Verilog code generating script generates architecture based on a selection of one of single XGBs or multi parallel XGBs. In an embodiment, the selection may be made by a user, for example a developer. Each XGB tree receives a first input from a trained model and a second input from the host server via the PCI express-AXI bridge. The tree architecture auto generation model 328 compares values according to the input; and each XGB tree produces one output (or tree value) based on the comparison, as described with reference to FIGS. 1A and 1B. The entire process can be completed in one clock cycle because of its unique architecture, which is direct condition for execution of decision tree. The tree values from all the trees may be taken and added to obtain a final inference, which may be the inference of the model. As previously described, the Verilog code generates a driver for FPGA architecture.

For instance, the Verilog code generates driver XGBoost architecture in Verilog for the FPGA pipeline for the control block, along with necessary handshaking signals. Moreover, the Verilog code generates architecture for memory-less trained model for FPGA block along with necessary interface with other blocks. Additionally, it generates parallel tree architecture for XGBoost along with necessary interfaces and signals which can be processed in a single clock. The Verilog code further generates tree type adders in a pipelined manner to compute the answer in minimum possible clock cycles. Herein, the tree architecture auto generation model 328 includes a tree generation module for generating tree values, and an adder module for adding the tree values to output a final inference.

Figure 4:
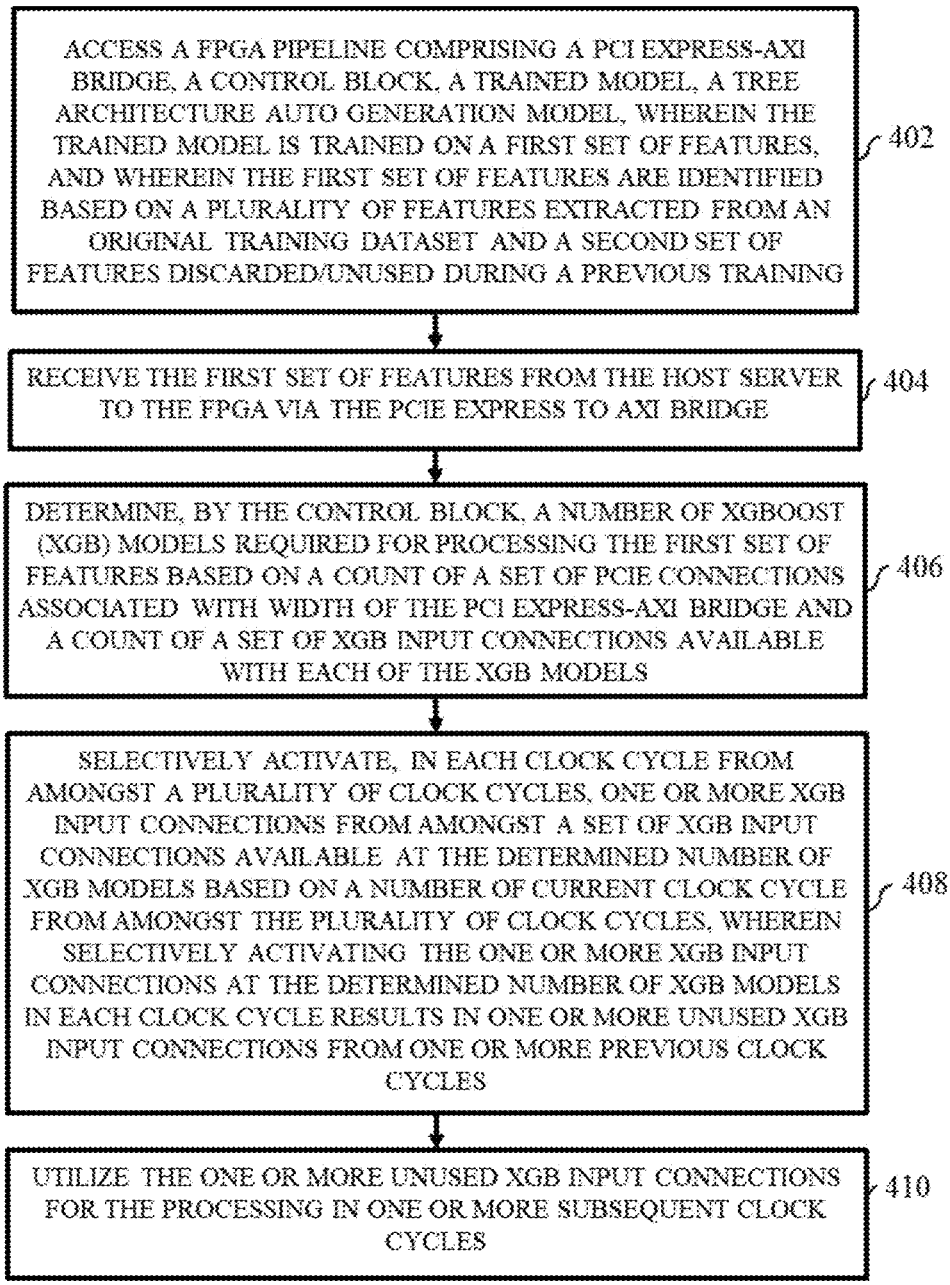
FIG. 4 is a flow diagram of a method implementing a low latency FPGA for inference by AI model according to some embodiments of the present disclosure.
Figure 5:
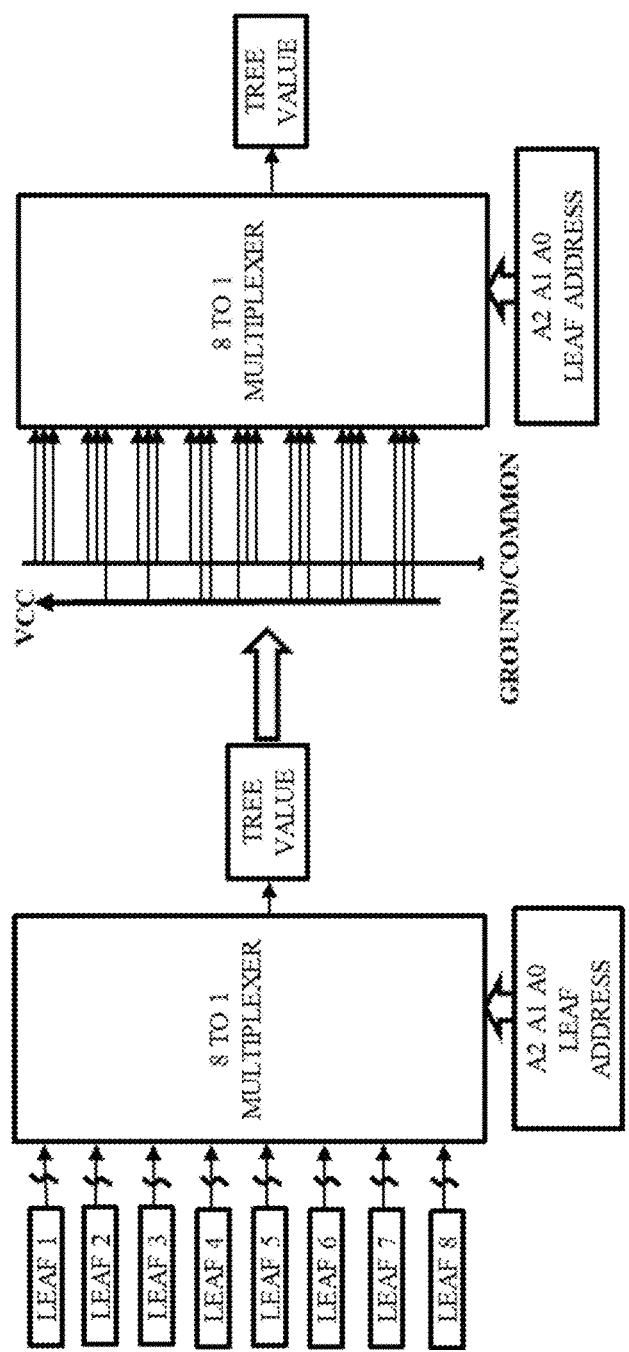
FIG. 5 illustrates memory-less architecture of a trained model associated with the disclosed FPGA according to some embodiments of the present disclosure.

FIG. 4 illustrates a flow diagram of a method 400 for implementing a low latency FPGA for inference by AI model in accordance with an example embodiment. The method 400 depicted in the flow chart may be executed by a system, for example, the system 202 of FIG. 2. In an example embodiment, the system 200 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 202. However, the operations of the method 400 can be described and/or practiced by using any other system.

At 402, the method 400 includes accessing a FPGA pipeline, for example the FPGA pipeline 300 (FIG. 3). the FPGA pipeline 300 includes the PCI express-AXI bridge 322, the control block 324, the trained Model 326, the tree architecture auto generation model 328. As described previously, the trained model 326 is trained on the first set of features that are identified based on difference of a plurality of features extracted from an original training dataset and a second set of features discarded/unused during a previous training (or training of the model).

At 404, the method 400 includes receiving the first set of features from the host server to the FPGA via the PCIe express to AXI bridge 322. The control block 324 determines a number of XGboost (XGB) models required for processing the first set of features based on a count of a set of PCIe connections associated with width of the PCI express-AXI bridge and a count of a set of XGB input connections available with each of the XGB models. For instance, in order to determine the number of XGB models required for processing the first set of features, it is determined whether the width of the PCI express-AXI bridge (i.e. the number of PCIe connections) is greater than or equal to the XGB model input width (i.e. the number of connections in each XGB model). If it is determined that the PCI express-AXI bridge is greater than or equal to the XGB model input, then it may be assumed that parallelization is not possible. However, if it is determined that the PCI express-AXI bridge is less than the XGB model input, then the number of parallel XGB models is obtained by using the following expression:

Number of parallel *XGB* models=(Width of *PCI* express–*AXI* bridge % *XGB* model input width)+1.

Each XGB model includes a plurality of XGB tress for processing the first set of features in parallel such that each XGB tree outputs an inference value based on the processing. Each XGB tree receives a first input from a trained model and a second input from the host server via the PCI express-AXI bridge, and wherein the trained model comprises a plurality of values associated with a training data to be consumed by the plurality of XGB trees, and wherein the trained model comprises a hard-coded model wherein the plurality of values are generated by connecting a wire with one of $V_{CC}$ terminal and a ground terminal, as illustrate with reference to FIG. 5.

At 406, the method 400 includes selectively activating, in each clock cycle from amongst a plurality of clock cycles, one or more XGB input connections from amongst a set of XGB input connections available at the determined number of XGB models based on a number of current clock cycle from amongst the plurality of clock cycles. Selectively activating the one or more XGB input connections at the determined number of XGB models in each clock cycle results in one or more unused XGB input connections from one or more previous clock cycles, as will be explained further with reference to FIGS. 6A and 6D.

Figure 6A:
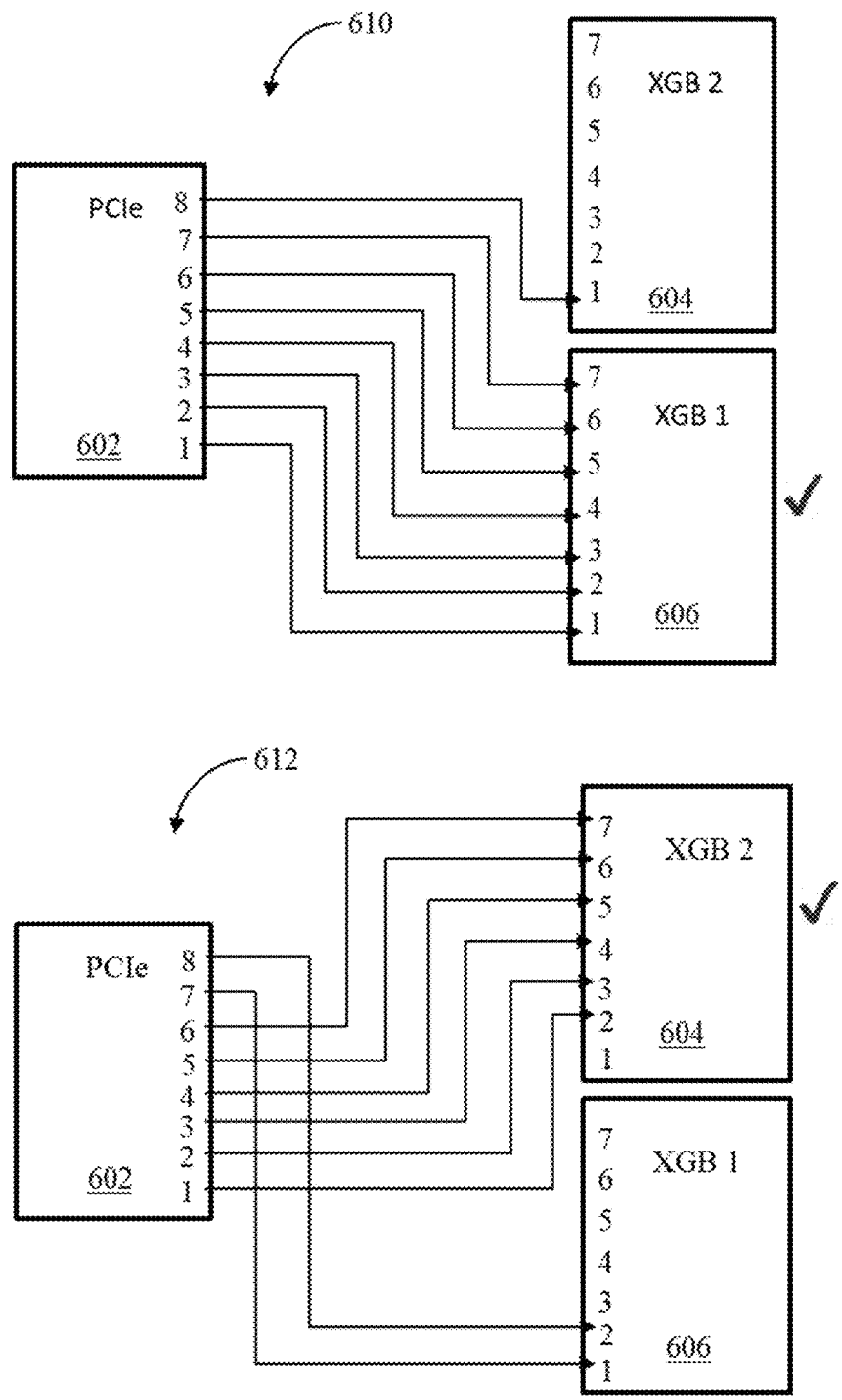
FIGS. 6A and 6D are representative illustrations of change in connections between a PCIe block and XGB models over multiple clock cycles, in accordance with an example embodiment of the present disclosure.
Figure 6B:
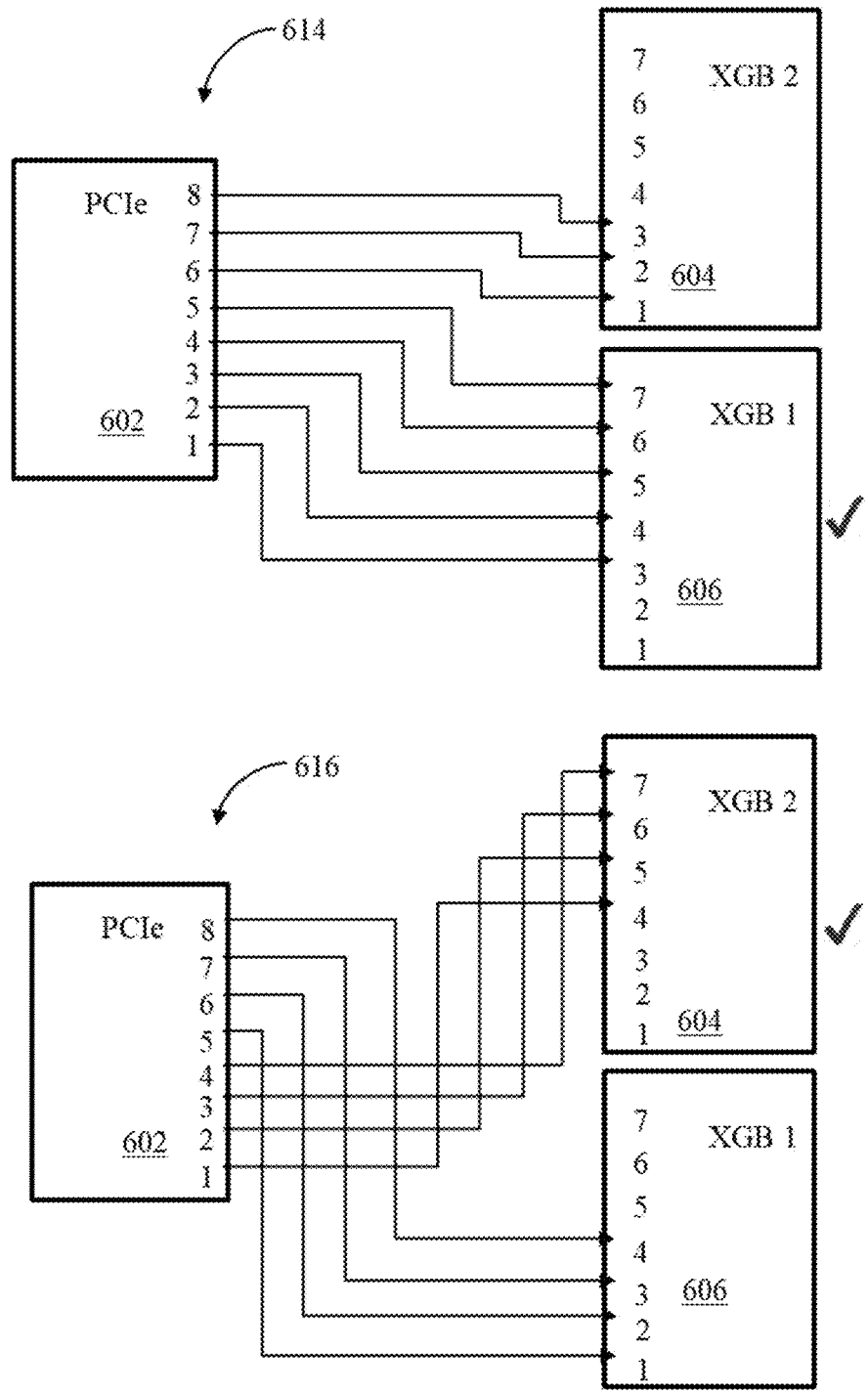
Figure 6C:
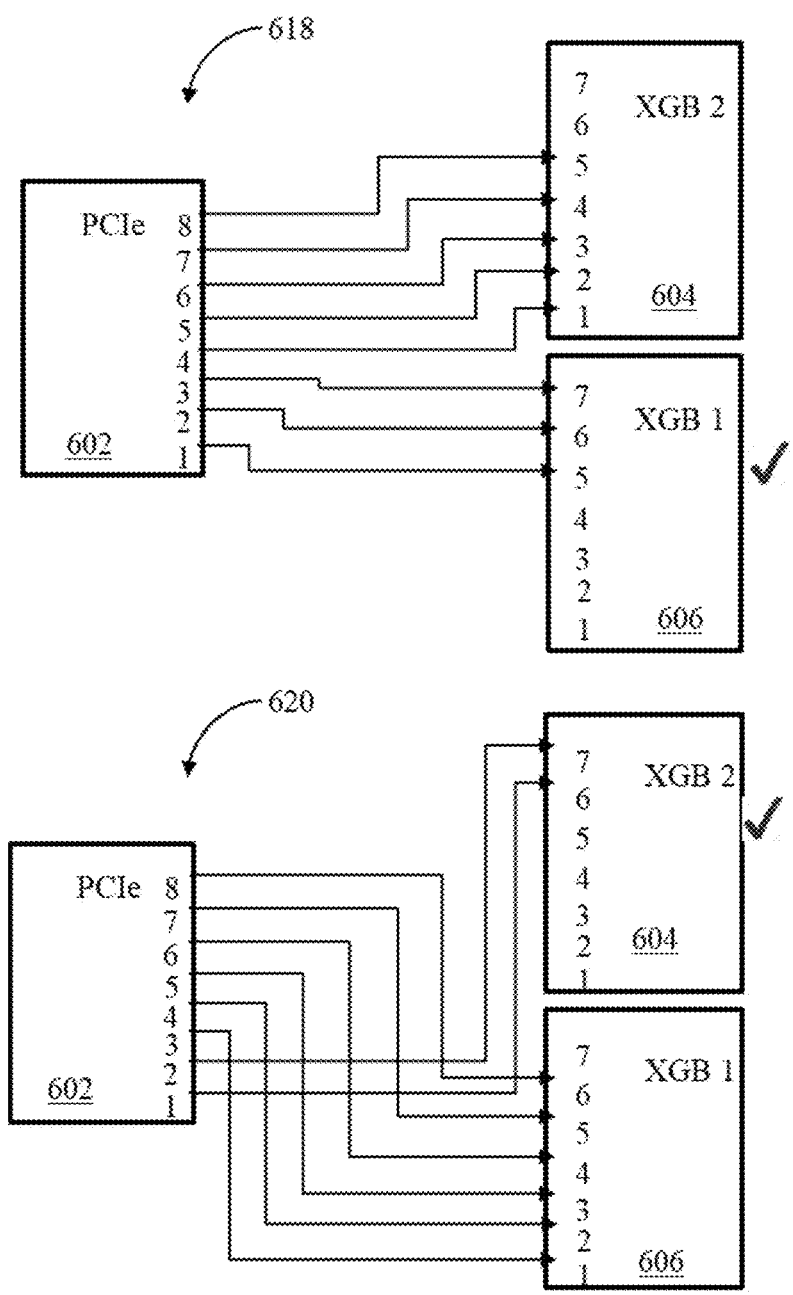
Figure 6D:
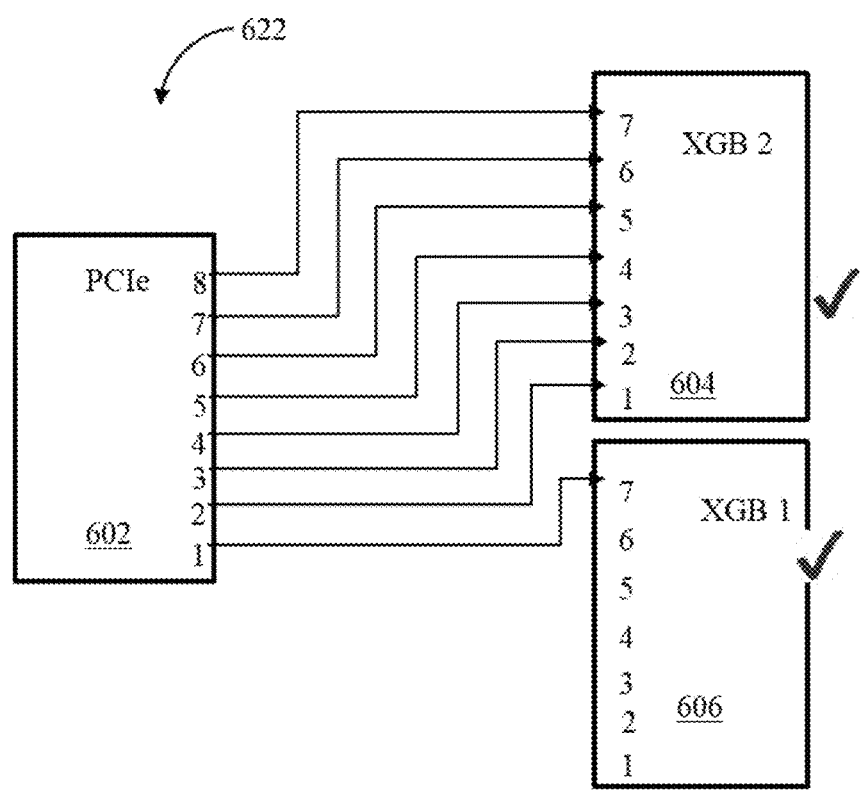

Referring now to FIGS. 6A and 6D, change in connections between a PCIe block and XGB models is illustrated over seven clock cycles, in accordance with an example embodiment of the present disclosure. Herein, it will be understood that the total number of connections of the PCIe 602, XGB models 604, 606 are taken here for illustrative purposes. In real-time applications, the number of connections may be greater or fewer than those shown here. Also, the number of XGB models may also be more than the number of XGB models shown here.

As illustrated in the first clock cycle (610), in order to accommodate eight PCIe connections, seven and one XGB input connections of XGB models 606, 604 respectively are made available. Hence, in the first clock cycle only XGB model 606 is activated, and thus connection 1 of XGB model 604 remains unused. In the second clock cycle 612, eight PCIe connections are accommodated by connecting to two (1-2) and six (2-7) XGB input connections of XGB models 606, 604 respectively. In this clock cycle XGB model 604 is activated, thus connections (1, 2) of XGB model 606 remains unused. In the third clock cycle 614, eight PCIe connections are accommodated by connecting to five (3-7) and three (1-3) XGB input connections of XGB models 606, 604 respectively. In this clock cycle XGB model 606 is activated, thus connections (1-3) of XGB model 604 remains unused. In the fourth clock cycle 616, eight PCIe connections are accommodated by connecting to four (1-4) and four (4-7) XGB input connections of XGB models 606, 604 respectively. In this clock cycle XGB model 604 is activated, thus connections (1-4) of XGB model 606 remains unused. In the fifth clock cycle 618, eight PCIe connections are accommodated by connecting to three (5-7) and five (1-5) XGB input connections of XGB models 606, 604 respectively. In this clock cycle XGB model 606 is activated, thus connections (1-5) of XGB model 604 remains unused. In the sixth clock cycle 620, eight PCIe connections are accommodated by connecting to three (5-7) and five (1-5) XGB input connections of XGB models 606, 604 respectively. In this clock cycle XGB model 604 is activated, thus connections (7-6) of XGB model 604 remains unused. In the seventh clock cycle 622, eight PCIe connections are accommodated by connecting to one (7) and seven (1-7) XGB input connections of XGB models 606, 604 respectively. In this clock cycle XGB model 606 is activated, thus connection (7) of XGB model 606 remains unused. As is seen from aforementioned example, in each clock cycle, the XGB input connections are selectively activated, thereby resulting in one or more unused XGB input connections from one or more previous clock cycles. Hence at the end of seventh cycle, there are seven unused connections. At 410, the one or more unused XGB input connections are utilized for the processing in one or more subsequent clock cycles. In an embodiment, the number of total connections may be computed based on the following expression:

Total number of connections (count of one or more *XGB* input connections)=(Least common multiplier of Width of *PCI* express–*AXI* bridge and *XGB* model input width)/(Width of *PCI* express–*AXI* bridge)

Herein, due to parallel processing of XGB models, over a period of clock cycles, additional unused connections are made available for processing of features. This functionality of the disclosed method and system enables in enhancing the throughput of processing.

Given the potential to transfer data and compute in pipelined parallelism, the disclosed method proposes two processes which can run in parallel, one to send the input data to the FPGA and another to collect the output results. The sending process can be the application process which marshals the parameters and sends the data to the FPGA. The receiving process could be a daemon process which reads the output results from the FPGA while copying it into a shared memory region that is visible to the application process, as is depicted in FIG. 3. The sending process in order to send the input data to the FPGA over PCIE has to invoke the write system call after opening the device descriptor. This is enabled by the device driver. The receiving daemon process will invoke the read system call to read the results output from the FPGA.

Figure 7:
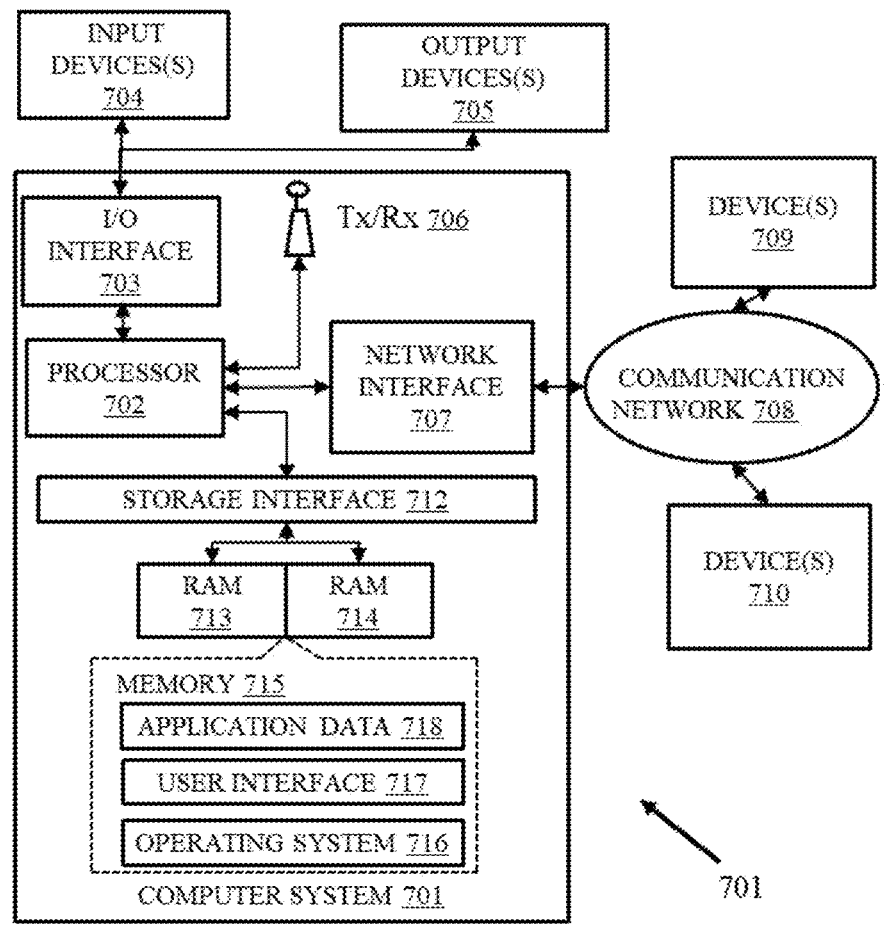
FIG. 7 is a block diagram of an exemplary computer system for implementing embodiments consistent with the present disclosure.

FIG. 7 is a block diagram of an exemplary computer system 701 for implementing embodiments consistent with the present disclosure. The computer system 701 may be implemented in alone or in combination of components of the system 102 (FIG. 1). Variations of computer system 701 may be used for implementing the devices included in this disclosure. Computer system 701 may comprise a central processing unit ("CPU" or "hardware processor") 702. The hardware processor 702 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 702 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc. The processor 502 may be a multi-core multi-threaded processor.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 608 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709 and 710. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of programs or database components, including, without limitation, an operating system 716, user interface application 717, user/application data 718 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 701 may store user/application data 718, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, (the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform. Example scenario:

In an example scenario, the FPGA experiments were carried out on 2 socket HP DL380 Gen10 server.

The FPGA used was the Alveo U280 board which was inserted into a PCIE Gen 3 16× slot in the server. The FPGA was synthesized at a frequency of 250 MHz using Vivado2019 and PCIE ip DMA/Bridge Subsystem for PCI Express v4.1 and XDMA driver V2018. The resulting bitstream is used to program the FPGA. Once the FPGA is programmed and the device drivers are loaded the FPGA subsystem is ready for operation. For taking the performance measurements, first the receiver process is started and immediately afterwards the sender process is forked. The sender process then sends a fixed set of input data to the FPGA. As soon as the receiver process receives all the expected results it exits. The start and end time of the receiver process is used to calculate the inference throughput.

Each feature was encoded to 4 bits size in the FPGA implementation. So this means that an input with 122 feature vectors will require 488 bits or 61 bytes. The xdma core was con_gured for a width of 512 bits (64 bytes). In our implementation only one input would be sent every clock cycle. So out of 64 bytes, 61 bytes would contain valid input data and the remaining 3 bytes were padded to zero. Given that the xgboost FPGA implementation has been synthesized at 250 MHz theoretically one input could arrive at each clock cycle (4 ns). Given 64 bytes of data this could mean a maximum 16 GB per second or 250 million inferences per second. A PCIE v3 16× connection can theoretically deliver about slightly more than 15 GB/sec accounting for signaling overheads.

Figure 8:
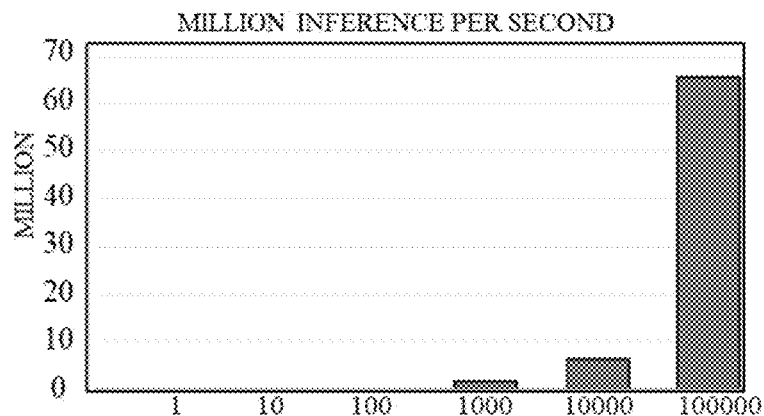
FIG. 8 illustrates a graphical representation for throughput achieved by the FPGA implementation as the input batch size is varied.

FIG. 8 illustrates a graphical representation for throughput achieved by the FPGA implementation as the input batch size is varied. It shows an increase in throughput with increase in input batch size. The latency for a single inference is measured to be 460 micro-seconds. The latency for xgboost inference in the FPGA is only 9 clock cycles. Each layer in the architecture contributes to 1 clock cycle delay. In the first clock cycle the comparators execute the comparison. In the following clock cycle the multiplexers select the correct tree value. The remaining 7 clock cycles is used up by each layer in the adder tree. As the xgboost design has been synthesized at 250 MHz (4 ns clock), it can be seen that the xgboost compute latency on the FPGA is less than 40 ns which is very negligible compared to the 400+ microseconds overall latency which is consumed by communication over PCIE. The results also impress the need for batching inputs for achieving high inference throughput on the FPGA {this makes best use of the pipelining provided by the FPGA Hardware design. It can be seen that the maximum throughput achieved is 65 million inferences per second for a batch size of 100000. This is slightly less than ⅓ rd of the maximum possible throughput permitted by a PCIE v3 ×16 connection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for low latency FPGA based system for inference by AI model. The embodiments of present disclosure herein address the technical problem of high latency and low throughput of systems in decision making models/processes such as recommendation models. The disclosed embodiments exploits parallelism in processing of XGB models and execute the algorithm with minimum possible latency and maximum possible throughput. Additionally, the model uses a trained model that is (re)trained using only those features which the model had used during training, remaining features are discarded during retraining of the model. The use of such selected set of features (referred to as first set of features in the aforementioned description) thus led to reduction in the size of digital circuit significantly for the hardware implementation. This also contributed greatly in enhancing the system performance.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
accessing, via one or more hardware processors, a field programmable gate arrays (FPGA) pipeline comprising a PCI express-AXI bridge, a control block, a trained Model, and a tree architecture auto generation model, wherein the trained model is trained on a first set of features, and wherein the first set of features are identified based on a plurality of features extracted from an original training dataset and a second set of features unused during a previous training;
receiving the first set of features from a host server to the FPGA via the PCIe express to AXI bridge, via the one or more hardware processors;
autogenerating, by a tree architecture auto generation model, at least one of single XGboost (XGB) models and multi-parallel XGB models based on a user input, wherein each XGB model comprises a plurality of XGB tress for processing the first set of features in parallel, and each XGB tree outputs an inference value based on the processing, wherein the each XGB tree receives a first input from a trained model and a second input from the host server via the PCI express-AXI bridge, wherein the trained model comprises a plurality of values associated with a training data to be consumed by the plurality of XGB trees, wherein the trained model comprises a hard-coded model, and wherein the plurality of values are generated by connecting a wire with one of Vcc terminal and a ground terminal;
determining, by the control block, a number of XGB models required for processing the first set of features based on a count of a set of PCIe connections associated with width of the PCI express-AXI bridge and a count of a set of XGB input connections available with each of the XGB models, via the one or more hardware processors;
selectively activating, in each clock cycle from amongst a plurality of clock cycles, one or more XGB input connections from amongst a set of XGB input connections available at the determined number of XGB models based on a number of current clock cycle from amongst the plurality of clock cycles, via the one or more hardware processors, wherein selectively activating the one or more XGB input connections at the determined number of XGB models in each clock cycle results in one or more unused XGB input connections from one or more previous clock cycles; and
utilizing, via the one or more hardware processors, the one or more unused XGB input connections for the processing in one or more subsequent clock cycles.

2. The processor implemented method of claim 1, wherein a count of the one or more XGB input connections is determined by using following expression:
Count of the one or more XGB input connections=(Least common multiplier of width of PCI express-AXI bridge and XGB model input width)/(Width of PCI express-AXI bridge).

3. The processor implemented method of claim 1, wherein the determined number of XGB models operate in parallel.

4. The processor implemented method of claim 1, wherein the host server comprises a central processing unit (CPU).

5. A system, comprising:
a field programmable gate arrays (FPGA) pipeline comprising a PCI express-AXI bridge, a control block, a trained model, and a tree architecture auto generation model;
a host server;
a memory storing instructions;
one or more communication interfaces; and
one or more hardware processors coupled to the memory and the FPGA via the one or more communication interfaces, wherein the one or more hardware processors are configured by the instructions to:
access the FPGA, wherein the trained model is trained on a first set of features, and wherein the first set of features are identified based on a plurality of features extracted from an original training dataset and a second set of features unused during a previous training;
receive the first set of features from the host server to the FPGA via the PCIe express to AXI bridge;
autogenerate at least one of single XGboost (XGB) models and multi-parallel XGB models based on a user input, wherein each XGB model comprises a plurality of XGB tress for processing the first set of features in parallel, and each XGB tree outputs an inference value based on the processing, wherein the each XGB tree receives a first input from a trained model and a second input from the host server via the PCI express-AXI bridge, and wherein the trained model comprises a plurality of values associated with a training data to be consumed by the plurality of XGB trees, wherein the trained model comprises a hard-coded model, and wherein the plurality of values are generated by connecting a wire with one of Vcc terminal and a ground terminal;

determine, a number of XGB models required for processing the first set of features based on a count of a set of PCIe connections associated with width of the PCI express-AXI bridge and a count of a set of XGB input connections available with each of the XGB models, via the one or more hardware processors;

selectively activate, in each clock cycle from amongst a plurality of clock cycles, one or more XGB input connections from amongst a set of XGB input connections available at the determined number of XGB models based on a number of current clock cycle from amongst the plurality of clock cycles, wherein selectively activating the one or more XGB input connections at the determined number of XGB models in each clock cycle results in one or more unused XGB input connections from one or more previous clock cycles; and utilize the one or more unused XGB input connections for the processing in one or more subsequent clock cycles.

6. The system of claim 5, wherein a count of the one or more XGB input connections is determined by using following expression:

Count of the one or more XGB input connections=(Least common multiplier of width of the PCI express-AXI bridge and XGB model input width)/(Width of the PCI express-AXI bridge).

7. The system of claim 5, wherein the determined number of XGB models operate in parallel.

8. The system of claim 5, wherein the host server comprises a central processing unit (CPU).

9. One or more non-transitory machine readable information storage mediums comprising one or more instructions, which when executed by one or more hardware processors causes:

accessing a field programmable gate arrays (FPGA) pipeline comprising a PCI express-AXI bridge, a control block, a trained Model, a tree architecture auto generation model, wherein the trained model is trained on a first set of features, and wherein the first set of features are identified based on a plurality of features extracted from an original training dataset and a second set of features unused during a previous training;

receiving, the first set of features from a host server to the FPGA via the PCIe express to AXI bridge;

autogenerating, by a tree architecture auto generation model, at least one of single XGboost (XGB) models and multi-parallel XGB models based on a user input, wherein each XGB model comprises a plurality of XGB tress for processing the first set of features in parallel, and each XGB tree outputs an inference value based on the processing, wherein the each XGB tree receives a first input from a trained model and a second input from the host server via the PCI express-AXI bridge, wherein the trained model comprises a plurality of values associated with a training data to be consumed by the plurality of XGB trees, wherein the trained model comprises a hard-coded model, and wherein the plurality of values are generated by connecting a wire with one of Vcc terminal and a ground terminal;

determining, by the control block, a number of XGB models required for processing the first set of features based on a count of a set of PCIe connections associated with width of the PCI express-AXI bridge and a count of a set of XGB input connections available with each of the XGB models;

selectively activating, in each clock cycle from amongst a plurality of clock cycles, one or more XGB input connections from amongst a set of XGB input connections available at the determined number of XGB models based on a number of current clock cycle from amongst the plurality of clock cycles, wherein selectively activating the one or more XGB input connections at the determined number of XGB models in each clock cycle results in one or more unused XGB input connections from one or more previous clock cycles; and utilizing the one or more unused XGB input connections for the processing in one or more subsequent clock cycles.

* * * * *